United States Patent
Kim

(10) Patent No.: US 10,491,040 B2
(45) Date of Patent: Nov. 26, 2019

(54) WIRELESS POWER TRANSMITTING DEVICE AND METHOD OF CONTROLLING THE SAME

(71) Applicant: WITS Co., Ltd., Yongin-si, Gyeonggi-do (KR)

(72) Inventor: Young Ho Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 160 days.

(21) Appl. No.: 15/810,736

(22) Filed: Nov. 13, 2017

(65) Prior Publication Data

US 2018/0226833 A1   Aug. 9, 2018

(30) Foreign Application Priority Data

Feb. 6, 2017   (KR) ........................ 10-2017-0016318

(51) Int. Cl.
*H02J 50/10* (2016.01)
*H02M 1/32* (2007.01)
(Continued)

(52) U.S. Cl.
CPC .............. *H02J 50/10* (2016.02); *H02J 50/12* (2016.02); *H02M 1/32* (2013.01); *H02M 3/3376* (2013.01);
(Continued)

(58) Field of Classification Search
CPC ....... H02J 50/12; H02J 50/10; Y02B 70/1491; H02M 1/32; H02M 3/156;
(Continued)

(56) References Cited

U.S. PATENT DOCUMENTS

| 2010/0201204 A1* | 8/2010 | Sakoda ................... H02J 5/005 307/104 |
| 2014/0035386 A1* | 2/2014 | Hatanaka ............. H04B 5/0037 307/104 |

(Continued)

FOREIGN PATENT DOCUMENTS

| KR | 10-1210326 B1 | 12/2012 |
| KR | 10-2015-0046108 A | 4/2015 |

(Continued)

*Primary Examiner* — Jared Fureman
*Assistant Examiner* — Duc M Pham
(74) *Attorney, Agent, or Firm* — Harness, Dickey & Pierce, P.L.C.

(57) ABSTRACT

A wireless power transmitting device includes a wireless power generator configured to generate a wireless power based on a supplied power of a power source; a wireless power transmitter configured to transmit the wireless power to a receiving device in a wireless manner; a detector configured to detect either one or both of a voltage and a current of the wireless power transmitter; a distance calculator configured to calculate a distance from the wireless power transmitting device to the receiving device based on either one or both of the voltage and the current of the wireless power transmitter; a comparator configured to: compare a reference efficiency corresponding to the distance to a power transmission efficiency, and generate information of a transmission state based on a result of the comparison; and a controller configured to control the wireless power generator depending on an operation mode corresponding to the information of the transmission state.

17 Claims, 7 Drawing Sheets

(51) Int. Cl.
*H02M 3/337* (2006.01)
*H02J 50/12* (2016.01)
*H02M 7/5387* (2007.01)
*H02M 3/155* (2006.01)
*H02M 3/156* (2006.01)
*H02M 1/00* (2006.01)

(52) U.S. Cl.
CPC ............ *H02M 3/155* (2013.01); *H02M 3/156* (2013.01); *H02M 7/5387* (2013.01); *H02M 2001/007* (2013.01); *H02M 2001/0048* (2013.01); *H02M 2001/0058* (2013.01); *H02M 2001/0064* (2013.01); *Y02B 70/1491* (2013.01)

(58) Field of Classification Search
CPC ....... H02M 2001/0058; H02M 7/5387; H02M 2001/0048
See application file for complete search history.

(56) References Cited

U.S. PATENT DOCUMENTS

| 2014/0333153 | A1* | 11/2014 | Tanaka | H02J 5/005 307/104 |
| 2015/0371771 | A1* | 12/2015 | Abu Qahouq | H04B 5/0087 307/104 |
| 2018/0241252 | A1* | 8/2018 | Fan | H02J 50/12 |

FOREIGN PATENT DOCUMENTS

| KR | 10-2015-0100773 A | 9/2015 |
| WO | WO 2014/028271 A2 | 2/2014 |
| WO | WO 2014/099716 A1 | 6/2014 |

* cited by examiner

WIRELESS POWER TRANSMITTING DEVICE AND METHOD OF CONTROLLING THE SAME

CROSS-REFERENCE TO RELATED APPLICATIONS

This application claims the benefit under 35 USC 119(a) of Korean Patent Application No. 10-2017-0016318 filed on Feb. 6, 2017 in the Korean Intellectual Property Office, the entire disclosure of which is incorporated herein by reference for all purposes.

BACKGROUND

1. Field

The following description relates to a wireless power transmitting device and a method of controlling the same.

2. Description of Related Art

A wireless power transmitting device transmits wireless power to a receiving device in a wireless manner. When a foreign object is present during a wireless power transmission process, unnecessary power consumption, malfunctioning, and/or shortened service life may result. Therefore, a foreign object detection technology has been applied to a recent wireless power transmitting device.

If the wireless power transmitting device fails to detect the presence of a foreign object, or incorrectly determines the presence of a foreign object, unnecessary power consumption, malfunctioning, and/or a shortened service life may result.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, there is provided a wireless power transmitting device, including: a wireless power generator configured to generate a wireless power based on a supplied power of a power source; a wireless power transmitter configured to transmit the wireless power to a receiving device in a wireless manner; a detector configured to detect either one or both of a voltage and a current of the wireless power transmitter; a distance calculator configured to calculate a distance from the wireless power transmitting device to the receiving device based on either one or both of the voltage and the current of the wireless power transmitter; a comparator configured to: compare a reference efficiency corresponding to the distance to a power transmission efficiency, and generate information of a transmission state based on a result of the comparison; and a controller configured to control the wireless power generator depending on an operation mode corresponding to the information of the transmission state.

The controller may further be configured to: set the operation mode to a first operation mode in response to the power transmission efficiency being equal to or higher than the reference efficiency; set the operation mode to a second operation mode in response to the power transmission efficiency being lower than the reference efficiency; and control the wireless power generator such that a magnitude of the wireless power generated in response to the second operation mode being set is lower than a magnitude of the wireless power generated in response to the first operation mode being set.

The apparatus may further include: a demodulator configured to: receive a packet signal including information of a magnitude of a received power of the receiving device; and generate the information of the magnitude of the received power by demodulating the packet signal.

The apparatus may further include: a power calculator configured to calculate a magnitude of the supplied power of the power source based on a voltage and a current of the power source, wherein the comparator is configured to calculate the power transmission efficiency based on the magnitude of the supplied power and the magnitude of the received power, and wherein the detector further is configured to detect a voltage and a current of the power source.

The wireless power transmitter may further include a transmission coil configured to be electromagnetically coupled to the receiving device; and the voltage of the wireless power transmitter is a voltage of the transmission coil.

The distance calculator may further be configured to calculate the distance such that the distance calculated if the voltage is a first voltage is longer than the distance calculated if the voltage is a second voltage lower than the first voltage.

The comparator may further be configured to: in response to the voltage being a first voltage, determine the distance to be a first distance; and in response to the voltage being a second voltage lower than the first voltage, determine the distance to be a second distance shorter than the first distance.

The comparator may further be configured to determine the reference efficiency based on the distance.

The comparator may further be configured to determine the reference efficiency such that the reference efficiency determined if the distance is a first distance is lower than the reference efficiency determined if the distance is a second distance shorter than the first distance.

The comparator may further be configured to: in response to the distance being a first distance, determine the reference efficiency to have a first magnitude; and in response to the distance being a second distance longer than the first distance, determine the reference efficiency to have a second magnitude less than the first magnitude.

The controller may further be configured to: determine a switching frequency of the wireless power generator based on the distance; and transmit a control signal of the switching frequency to the wireless power generator.

The wireless power generator may further include: a DC-DC converter including a first switch, and configured to convert a DC voltage of the power source through an on-off operation of the first switch and generate conversion power; and an inverter including a second switch and a third switch, and configured to generate the wireless power from the conversion power through an on-off operation of the second switch and the third switch, wherein the controller is further configured to generate a converter control signal to be transmitted to the first switch and an inverter control signal to be transmitted to the second switch and the third switch, and wherein either one or both of the converter control signal and the inverter control signal is changed according to a change in the operation mode.

In another general aspect, there is provided a method of controlling a wireless power transmitting device, including: detecting either one or both of a voltage or a current of a transmission coil in response to a wireless power transmitting device transmitting a wireless power to a receiving device through the transmission coil; generating information of a distance between the wireless power transmitting device and the receiving device based on either one or both of the voltage or the current of the transmission coil; generating information of a reference efficiency corresponding to the information of the distance; comparing the reference efficiency to a power transmission efficiency of the wireless power transmitting device; and reducing a magnitude of the wireless power in response to the power transmission efficiency being lower than the reference efficiency.

The method of controlling a wireless power transmitting device may further include: generating information of a magnitude of a received power by receiving, from the receiving device, a packet signal including the information of the magnitude of the received power of the receiving device, and demodulating the packet signal.

The method of controlling a wireless power transmitting device may further include: calculating a magnitude of a supplied power from a voltage and a current of a power source of the wireless power transmitting device, wherein the comparing may include calculating the power transmission efficiency based on the magnitude of the supplied power and the magnitude of the received power, and wherein the detecting may include detecting the voltage and the current of the power source.

A non-transitory computer-readable medium may store instructions that, when executed by a processor, cause the processor to perform the method of controlling a wireless power transmitting device.

In another general aspect, there is provided a wireless power transmitting device, including: a wireless power generator configured to generate a wireless power based on a supplied power of a power source; a wireless power transmitter configured to: transmit the wireless power to a receiving device, and receive information of a magnitude of a received power of the receiving device; a power calculator configured to calculate a magnitude of the supplied power based on either one or both of a voltage and a current of the power source; a distance calculator configured to calculate a distance from the wireless power transmitting device to the receiving device based on either one or both of a voltage and a current of the wireless power transmitter; a comparator configured to: determine a reference efficiency based on the distance, calculate a power transmission efficiency based on the magnitude of the supplied power and the magnitude of the received power, and compare the reference efficiency to the power transmission efficiency; and a controller configured to control the wireless power generator to reduce the magnitude of the generated wireless power in response to the power transmission efficiency being lower than the reference efficiency.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
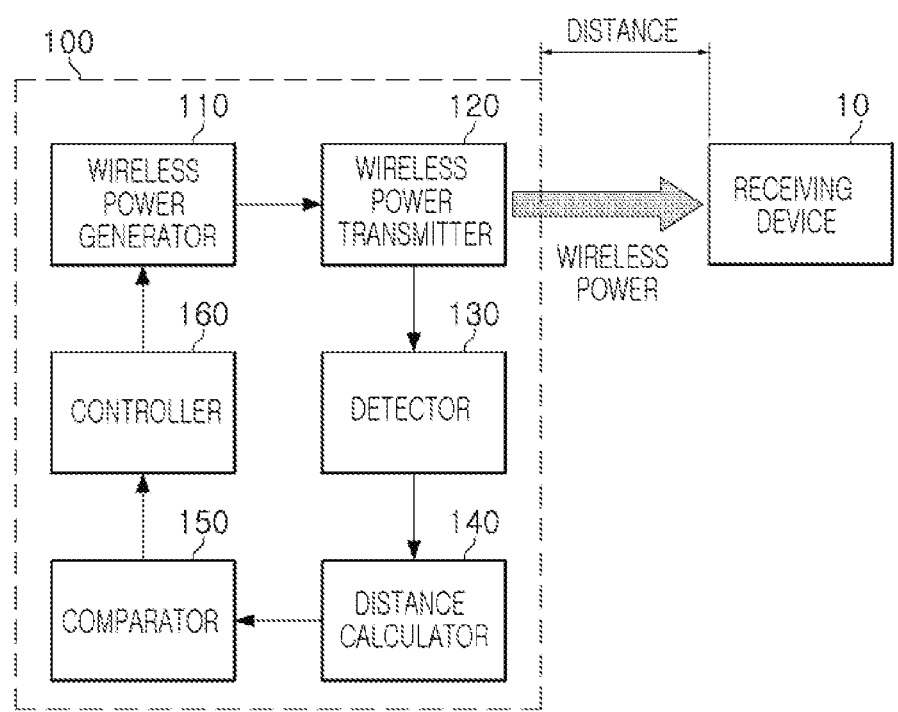
FIG. 1 is a block diagram illustrating a wireless power transmitting device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. In addition, the use of the term "may" herein with respect to an example or embodiment, e.g., as to what an example may include or implement, means that at least one example or embodiment exists where such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

Subsequently, examples are described in further detail with reference to the accompanying drawings.

FIG. 1 is a block diagram illustrating a wireless power transmitting device according to an example.

Referring to the example of FIG. 1, a wireless power transmitting device 100 according to an example includes a mutual-inductance, and a coupling coefficient k. The frequency, the degree of self-inductance, the degree of mutual-inductance, and the coupling coefficient k may be calculated from a voltage or a current of the wireless power transmitter 120. Thus, the detector 130 detects a voltage or a current of the wireless power transmitter 120, and thus may detect the frequency, the degree of self-inductance, the degree of mutual-inductance, and the coupling coefficient k.

For example, the electrical value of the wireless power transmitter 120, the maximum voltage, and the frequency may be changed depending on a distance between the wireless power transmitter 120 and the receiving device 10 as illustrated in Table 1 below. A first row of Table 1 refers to the distance between the wireless power transmitter 120 and the receiving device 10, a second row of Table 1 refers to the frequency, and a third row of Table 1 refers to the maximum voltage.

TABLE 1

| 5 mm | 6 mm | 7 mm | 8 mm | 9 mm | 10 mm | 11 mm | 12 mm |
|---|---|---|---|---|---|---|---|
| 152.6 kHz | 149.3 kHz | 148.1 kHz | 146.7 kHz | 143.6 kHz | 141.9 kHz | 139.8 kHz | 138.1 kHz |
| 36.4 V | 39.0 V | 40.4 V | 42.6 V | 43.0 V | 49.7 V | 53.5 V | 57.6 V | wireless power generator 110, a wireless power transmitter 120, a detector 130, a distance calculator 140, a comparator 150, and/or a controller 160, and transmits wireless power to a receiving device 10.

The wireless power generator 110 generates wireless power from a power source. For example, the power source may be power output from a battery or wired power input from an external source.

The wireless power transmitter 120 transmits the wireless power to the receiving device 10 in a wireless manner. Here, For example, the electrical value of the wireless power transmitter 120, the degree of self-inductance, the degree of mutual-inductance, and the coupling coefficient k, change depending on a distance between the wireless power transmitter 120 and the receiving device 10, as illustrated in Table 2. A first row of Table 2 refers to the distance between the wireless power transmitter 120 and the receiving device 10, a second row of Table 2 refers to the degree of self-inductance, and a third row of Table 2 refers to the degree of mutual-inductance.

TABLE 2

| 5 mm | 6 mm | 7 mm | 8 mm | 9 mm | 10 mm | 11 mm | 12 mm |
|---|---|---|---|---|---|---|---|
| 10.64 uH | 10.2 uH | 9.97 uH | 9.75 uH | 9.61 uH | 9.4 uH | 9.258 uH | 9.15 uH |
| 0.626 | 0.582 | 0.546 | 0.507 | 0.495 | 0.435 | 0.401 | 0.381 |
| 11.21923 uH | 10.02347 uH | 9.151393 uH | 8.296686 uH | 7.976102 uH | 6.862507 uH | 6.228244 uH | 5.865492 uH | the wireless manner is a method in which the wireless power transmitter 120 electromagnetically transmits wireless power to the receiving device 10 even when not in physical contact with the receiving device 10. For example, the wireless power transmitter 120 is electronically coupled to the receiving device 10 by magnetic flux generated according to Ampere's Law, and transmits wireless power. Here, a degree of electromagnetic coupling between the wireless power transmitter 120 and the receiving device 10 is affected by a distance between the wireless power transmitter 120 and the receiving device 10.

The detector 130 detects a voltage or a current of the wireless power transmitter 120, and thus detects an electrical value. The degree of electromagnetic coupling between the wireless power transmitter 120 and the receiving device 10 has an effect on an electrical value of the wireless power transmitter 120. Here, the electrical value includes any one or any combination of any two or more of a maximum voltage, an average voltage, a maximum current, an average current, a frequency, a degree of self-inductance, a degree of The distance calculator 140 calculates a distance between the wireless power transmitter 120 and the receiving device 10 using an electrical value of the wireless power transmitter 120. For example, the relationship between the electrical value and a distance between the wireless power transmitter 120 and the receiving device 10 is determined through a pre-test operation. The distance calculator 140 stores the relationship therebetween in a method of a look-up table, and thus the distance calculator 140 compares an electrical value received from the detector 130 to information of the look-up table, thereby obtaining information of a distance between the wireless power transmitter 120 and the receiving device 10.

For example, the distance calculator 140 calculates a distance between the wireless power transmitter 120 and the receiving device 10 by applying the electrical value received from the detector 130 to an Equation defining the relationship between the electrical value and a distance between the wireless power transmitter 120 and the receiving device 10. Here, the Equation is derived by numerical analysis of data obtained through the pre-test operation.

Referring to the example of Table 1, the distance calculator 140 calculates a distance between the wireless power transmitter and the receiving device to allow a distance between the wireless power transmitter 120 and the receiving device 10 to be longer as a maximum voltage of the wireless power transmitter 120 is higher. For example, as the distance between the wireless power transmitter 120 and the receiving device 10 is increased, the maximum voltage of the wireless power transmitter 120 is increased. Further, the distance calculator 140 calculates the distance such that a longer distance is calculated for a larger maximum voltage than the distance calculated for a smaller maximum voltage.

The comparator 150 compares reference efficiency corresponding to a distance between the wireless power transmitter 120 and the receiving device 10 to power transmission efficiency, and generates information of a transmission state based on a result of the comparison (an efficiency comparison result). Here, the power transmission efficiency corresponds to a value in which a magnitude of received power of the receiving device 10 is divided by a magnitude of supplied power of a power source. The power transmission efficiency may be lowered by a foreign object present between the wireless power transmitter 120 and the receiving device 10.

The reference efficiency is higher than power transmission efficiency in response to a foreign object being present between the wireless power transmitter 120 and the receiving device 10, and is lower than power transmission efficiency in response to a foreign object not being present between the wireless power transmitter 120 and the receiving device 10. Thus, the comparator 150 determines that a transmission state is normal in response to power transmission efficiency being equal to or higher than reference efficiency, and determines that a transmission state is a state in which a foreign object intervenes in response to power transmission efficiency being lower than reference efficiency.

Meanwhile, power transmission efficiency is affected by a distance between the wireless power transmitter 120 and the receiving device 10. In this regard, because a degree of electromagnetic coupling between the wireless power transmitter 120 and the receiving device 10 is changed according to a distance between the wireless power transmitter 120 and the receiving device 10. A change in the degree of electromagnetic coupling causes a change in inductance of the wireless power transmitter 120 and a change in a frequency.

For example, the relationship between power transmission efficiency when a foreign object is not present between the wireless power transmitter 120 and the receiving device 10, and a distance between the wireless power transmitter 120 and the receiving device 10 is as illustrated in Table 3.

Thus, the comparator 150 sets reference efficiency corresponding to a distance between the wireless power transmitter 120 and the receiving device 10. Referring to Table 3, the comparator 150 generates information of reference efficiency to allow reference efficiency to be lower as a distance calculated by the distance calculator 140 is longer. For example, the set reference efficiency decreases as distance increases. Further, the comparator 150 may determine the reference efficiency such that a lower reference efficiency is determined for a shorter distance than the reference efficiency determined for a longer distance.

For example, reference efficiency for each distance between the wireless power transmitter 120 and the receiving device 10 is determined through pre-test operation, and is stored in the comparator 150. The pre-test operation may include, for example, measuring power transmission efficiencies for various distances in the absence of a foreign object that may otherwise affect power transmission efficiency. The comparator 150 receives information of a distance from the distance calculator 140, and selects one of a plurality of reference efficiencies based on the information of a distance.

Thus, the comparator 150 accurately determines whether a foreign object is present between the wireless power transmitter 120 and the receiving device 10.

The controller 160 controls the wireless power generator 110 depending on an operation mode corresponding to the information of a transmission state.

For example, the controller 160 sets an operation mode to a first operation mode in response to power transmission efficiency being equal to or higher than reference efficiency, sets an operation mode to a second operation mode in response to power transmission efficiency being lower than reference efficiency, and controls the wireless power generator 110 to allow a magnitude of the wireless power, in response to the second operation mode being performed, to be lower than a magnitude of the wireless power when the first operation mode is performed.

In other words, the controller 160 stops an operation of the wireless power generator 110 in response to a foreign object being present between the wireless power transmitter 120 and the receiving device 10 or reduces a magnitude of wireless power generated by the wireless power generator 110. Thus, unnecessary power consumption, malfunctioning, and/or a shortened service life of the wireless power transmitting device 100 may be prevented.

Due to the comparator 150, whether a foreign object is present between the wireless power transmitter 120 and the receiving device 10 is accurately determined. Accordingly, in the wireless power transmitting device 100 according to an example, the unnecessary power consumption, malfunctioning, and/or shortened service life may be more efficiently prevented.

Figure 2:
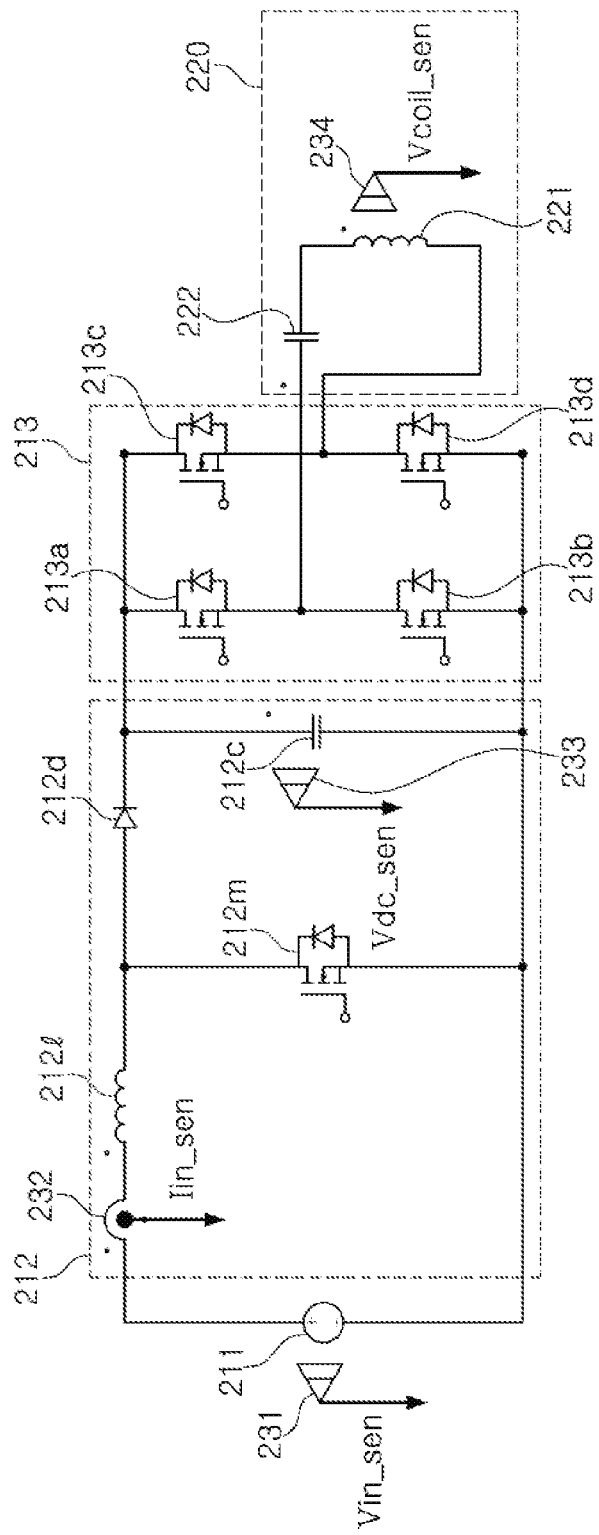
FIG. 2 is a circuit diagram illustrating a portion of a wireless power transmitting device according to an example in detail.

FIG. 2 is a circuit diagram illustrating a portion of a wireless power transmitting device according to an example in detail.

Referring to the example of FIG. 2, a wireless power transmitting device according to an example includes a wireless power generator, a wireless power transmitter 220, and a detector. In addition, the wireless power generator includes a power source 211, a DC-DC converter 212, and an inverter 213. Moreover, the detector includes a first detector 231, a second detector 232, a third detector 233, and a fourth detector 234.

The power source 211 outputs power, DC power.

The DC-DC converter 212 has a first switch 212m, converts a DC voltage of supplied power through an on-off operation of the first switch 212m, and thus generates conversion power. A duty ratio, a ratio of an ON state period

TABLE 3

| 5 mm | 6 mm | 7 mm | 8 mm | 9 mm | 10 mm | 11 mm | 12 mm |
| --- | --- | --- | --- | --- | --- | --- | --- |
| 69.6% | 69.4% | 69.2% | 68.8% | 68.4% | 67.9% | 67.4% | 66.8% | and an OFF state period of the first switch 212m, has an effect on a DC voltage of the conversion power, and is determined according to a pulse width of a driving signal input to a gate terminal of the first switch 212m. Thus, pulse width modulation (PWM), with respect to the driving signal, may be used to control the conversion power.

The DC-DC converter 212 includes an inductor 212l, a diode 212d, and a DC link capacitor 212c. The DC-DC converter 212 may be designed as one of a boost converter, which steps up a DC voltage of a supplied power, a buck converter, which steps down a DC voltage of a supplied power, or a buck-boost converter which steps up or steps down a DC voltage of a supplied power.

The inverter 213 has a second switch 213a, a third switch 213b, a fourth switch 213c, and a fifth switch 213d, and generates wireless power (AC power) from conversion power, through an on-off operation of the second switch 213a, the third switch 213b, the fourth switch 213c, and the fifth switch 213d. A driving signal on which is pulse width modulated and a frequency is controlled is input to gate terminals of the second switch 213a, the third switch 213b, the fourth switch 213c, and the fifth switch 213d. Meanwhile, a diode is connected to the second switch 213a, the third switch 213b, the fourth switch 213c, and the fifth switch 213d.

The wireless power transmitter 220 includes a transmission coil 221 and a transmission capacitor 222. The transmission coil 221 is configured to be electronically coupled to a receiving device.

The first detector 231 detects a voltage Vin_sen of the power source 211. The voltage Vin_sen is used to calculate power transmission efficiency.

The second detector 232 detects a current Iin_sen of the power source 211. The current Iin_sen is used to calculate power transmission efficiency.

The third detector 233 detects a voltage Vdc_sen of the DC link capacitor 212c. The voltage Vdc_sen is used to control the DC-DC converter 212.

The fourth detector 234 detects a voltage Vcoil_sen of the transmission coil 221. The voltage Vcoil_sen is used to calculate a distance between a wireless power transmitter and a receiving device.

Meanwhile, the first detector 231, the second detector 232, the third detector 233, and the fourth detector 234 are provided as a sampling circuit sampling an electrical value for each predetermined period.

Figure 3:
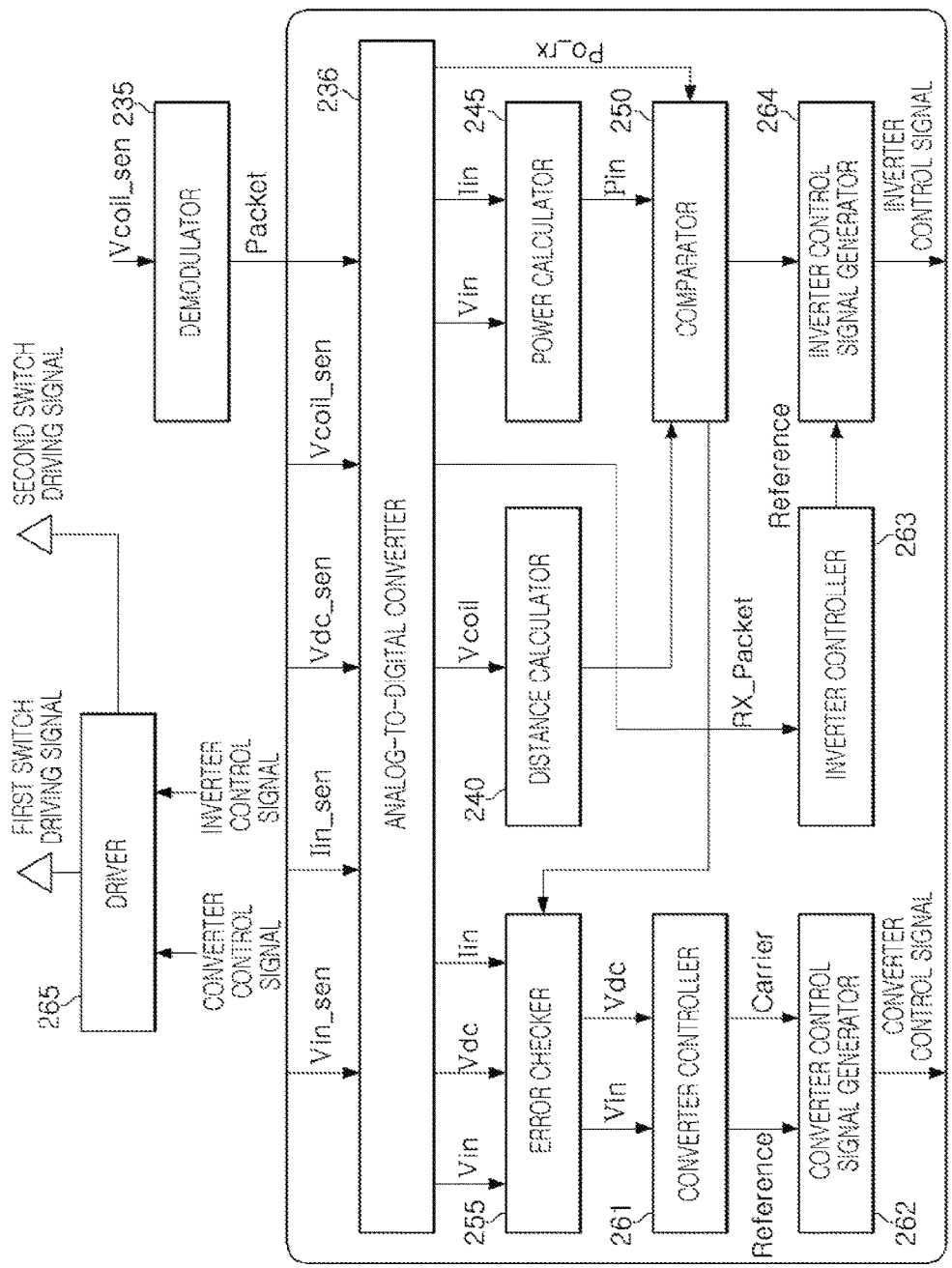
FIG. 3 is a block diagram illustrating another portion of a wireless power transmitting device according to an example in detail.

FIG. 3 is a block diagram illustrating another portion of a wireless power transmitting device according to an example in detail.

Referring to the example of FIG. 3, a wireless power transmitting device according to an example includes a demodulator 235, an analog-to-digital converter 236, a distance calculator 240, a power calculator 245, a comparator 250, an error checker 255, and a controller. The controller includes a converter controller 261, a converter control signal generator 262, an inverter controller 263, an inverter control signal generator 264, and a driver 265.

The demodulator 235 receives a packet signal having information of a magnitude of received power of a receiving device from the receiving device and demodulates the packet signal, thereby generating the information of a magnitude of received power. For example, the demodulator 235 uses an amplitude-shift keying (ASK) modulation scheme or an on-off keying (OOK) modulation scheme.

For example, the demodulator 235 receives the packet signal through a transmission coil, and thus receives the voltage Vcoil_sen of the transmission coil detected by a detector. Thereafter, the demodulator 235 transmits a packet having information of a magnitude of received power to the analog-to-digital converter 236.

The analog-to-digital converter 236 performs analog-to-digital conversion on a voltage Vin_sen of a power source, a current Iin_sen of the power source, a voltage Vdc_sen of a DC link capacitor, and a voltage Vcoil_sen of a transmission coil, thereby generating a voltage value Vin of a power source, a current value Iin of the power source, a voltage value Vdc of a DC link capacitor, a voltage value Vcoil of a transmission coil, and a received power value Po_rx.

The distance calculator 240 calculates a distance between the wireless power transmitter and the receiving device based on the voltage Vcoil_sen of a transmission coil, and generates information of a distance and transmits the information to the comparator 250.

The power calculator 245 calculates a magnitude of supplied power from the voltage value Vin of a power source and the current value Iin of the power source, and generates a supplied power value Pin.

The comparator 250 calculates a power transmission efficiency value in which the received power value Po_rx is divided by the supplied power value Pin, and generates a reference efficiency value based on the information of a distance between the wireless power transmitter and the receiving device. Thereafter, the comparator 250 compares the power transmission efficiency value to the reference efficiency value, and generates information of a transmission state according to an efficiency comparison result.

The error checker 255 checks for an error in the voltage value Vin of a power source, the current value Iin of the power source, the voltage value Vdc of a DC link capacitor, and a power transmission efficiency value calculated by the comparator 250. The error checker 255 controls the detector, the analog-to-digital converter 236, and the comparator 250 based on an error checking result, and transfers values in which error checking is completed to the converter controller 261.

The converter controller 261 generates a reference value based on the voltage value Vin of a power source, and generates a carrier value based on the voltage value Vdc of a DC link capacitor. For example, the converter controller 261 receives information of a distance between a wireless power transmitter and a receiving device from the distance calculator 240, and generates the reference value or the carrier value corresponding to the information of a distance.

The converter control signal generator 262 generates a converter control signal. A switching frequency and a pulse width of the converter control signal are determined based on the reference value and the carrier value.

The inverter controller 263 generates a reference value based on a feedback signal included in a packet signal received from a receiving device. For example, the inverter controller 263 receives the information of a distance between a wireless power transmitter and a receiving device from the distance calculator 240, and generates the reference value corresponding to the information of a distance.

The inverter control signal generator 264 generates an inverter control signal. A switching frequency and a pulse width of the inverter control signal are determined based on a reference value generated by the inverter controller 263.

In addition, either one or both of the converter control signal generator 262 and the inverter control signal generator 264 receives information of a transmission state from the comparator 250, and selects an operation mode corresponding to the information of a transmission state.

For example, either one or both of the converter control signal generator 262 and the inverter control signal generator 264 sets an operation mode to a first operation mode, in response to power transmission efficiency being equal to or higher than reference efficiency, and sets the operation mode to a second operation mode, in response to power transmission efficiency being lower than reference efficiency, and generates a converter control signal or inverter control signal so as to allow a magnitude of the wireless power when the second operation mode is performed to be lower than a magnitude of the wireless power when the first operation mode is performed.

The driver 265 generates a first switch driving signal from the converter control signal, and generates a second switch driving signal and a third switch driving signal from the inverter control signal.

Figure 4:
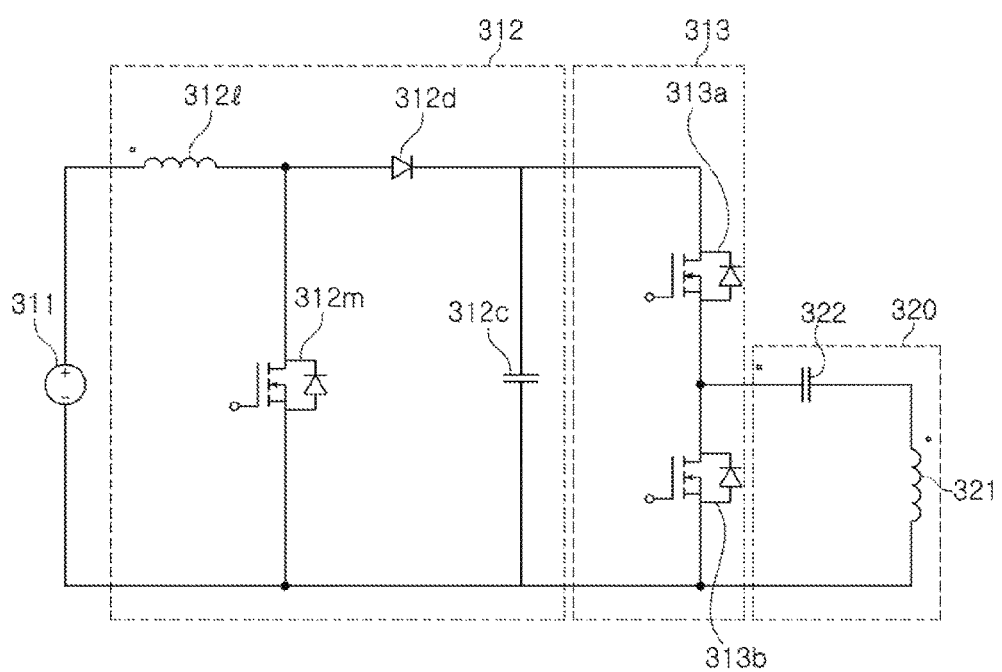
FIG. 4 is a circuit diagram illustrating a case in which an inverter is a half-bridge inverter, in a wireless power generator of the example of FIG. 2.

FIG. 4 is a circuit diagram illustrating a case in which an inverter is a half-bridge inverter in a wireless power generator according to the example of FIG. 2.

Referring to the example of FIG. 4, a wireless power generator is designed as a 2-stage system including a power source 311, a DC-DC converter 312, and an inverter 313. In addition, a wireless power transmitter 320 includes a transmission coil 321 and a transmission capacitor 322.

The DC-DC converter 312 includes a first switch 312m, an inductor 312l, a diode 312d, and a DC link capacitor 312c.

The inverter 313 includes a second switch 313a and a third switch 313b, and is designed as a half-bridge inverter.

Figure 5:
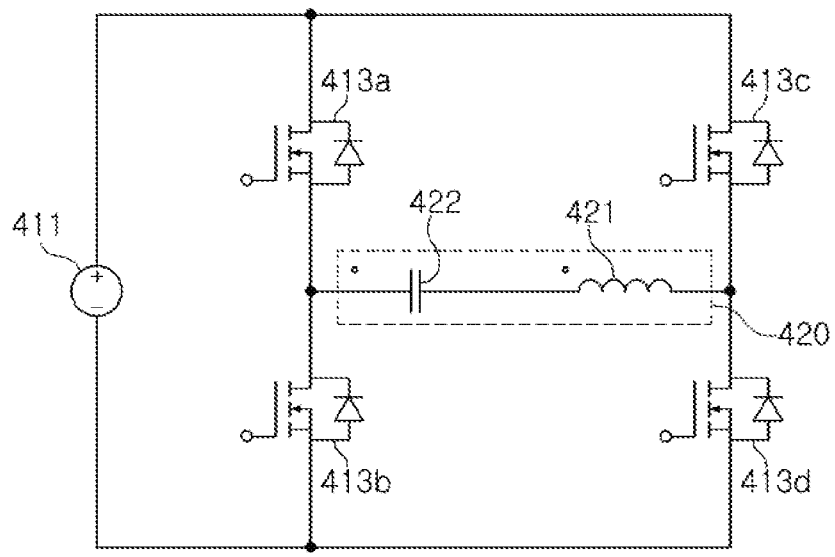
FIG. 5 is a circuit diagram illustrating a case in which a converter is omitted from a wireless power generator of the example of FIG. 2.

FIG. 5 is a circuit diagram illustrating a case in which a converter is omitted from the wireless power generator according to the example of FIG. 2.

Referring to the example of FIG. 5, a wireless power generator is designed as a 1-stage system including a power source 411 and an inverter. In addition, a wireless power transmitter 420 includes a transmission coil 421 and a transmission capacitor 422.

The inverter includes a second switch 413a, a third switch 413b, a fourth switch 413c, and a fifth switch 413d, and is designed as a full-bridge inverter.

Figure 6:
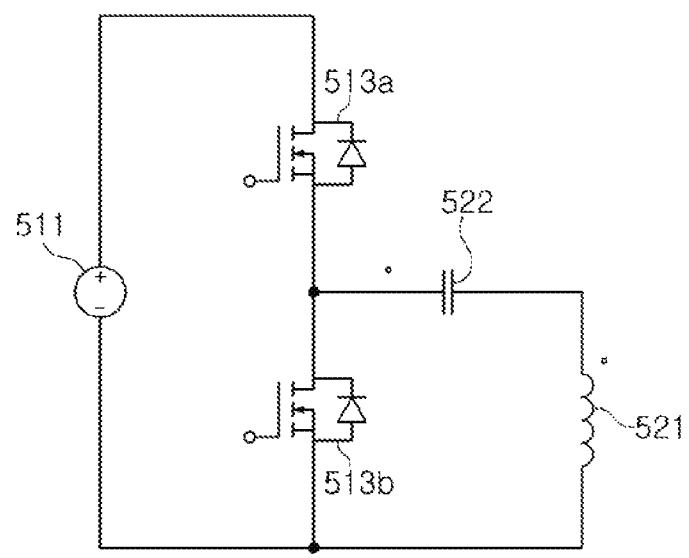
FIG. 6 is a circuit diagram illustrating a case in which a converter is omitted from the wireless power generator of the example of FIG. 4.

FIG. 6 is a circuit diagram illustrating a case in which a converter is omitted from the wireless power generator according to the example of FIG. 4.

Referring to the example of FIG. 6, a wireless power generator is designed as a 1-stage system including a power source 511 and an inverter. In addition, a wireless power transmitting device includes a transmission coil 521 and a transmission capacitor 522.

The inverter includes a second switch 513a and a third switch 513b, and is designed as a half-bridge inverter.

Figure 7:
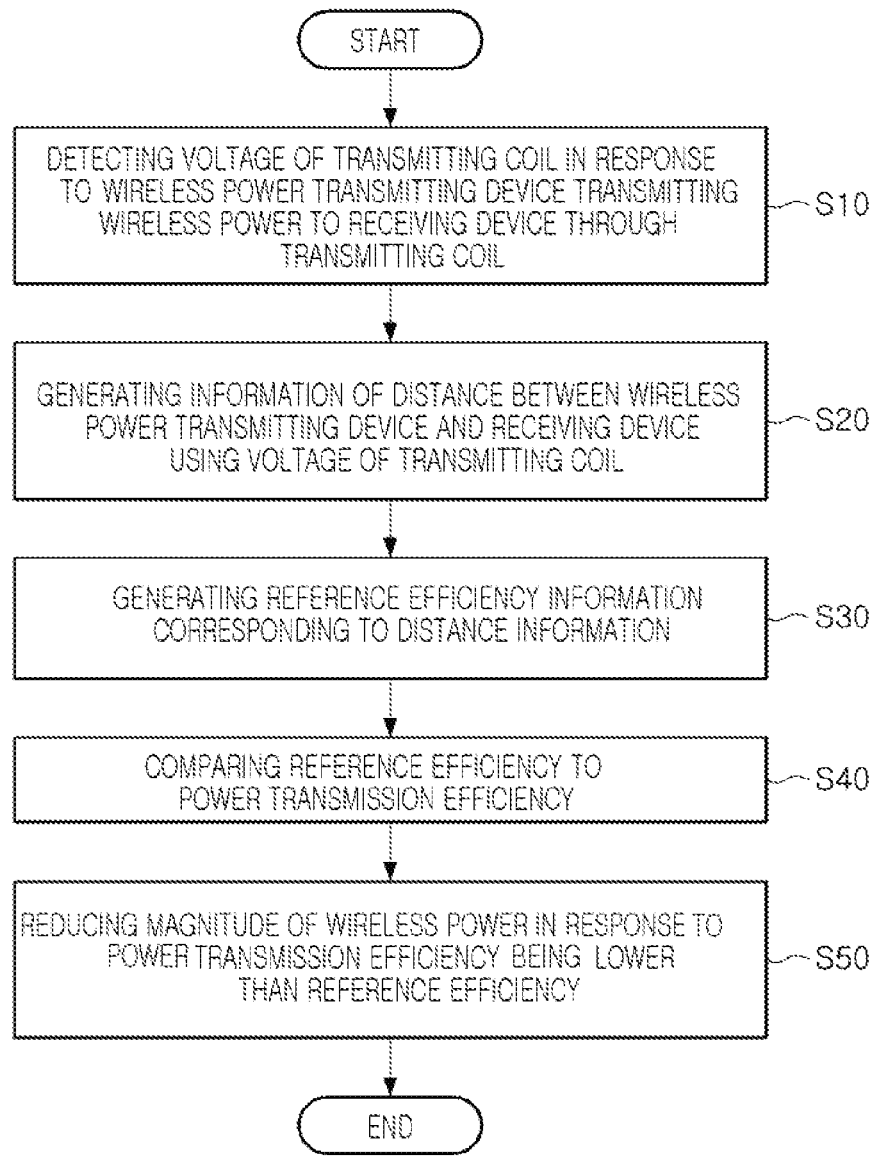
FIG. 7 is a flow chart illustrating a method of controlling a wireless power transmitting device according to an example.

FIG. 7 is a flow chart illustrating a method of controlling a wireless power transmitting device according to an example.

Referring to the example of FIG. 7, a method of controlling a wireless power transmitting device according to an example includes detecting S10 a voltage of a transmission coil in response to a wireless power transmitter transmitting wireless power to a receiving device through the transmission coil, generating S20 information of a distance between the wireless power transmitter and the receiving device from the voltage of the transmission coil, generating S30 information of reference efficiency corresponding to the information of the distance, comparing S40 the reference efficiency to power transmission efficiency of the wireless power transmitting device, and reducing S50 a magnitude of the wireless power in response to the power transmission efficiency being lower than the reference efficiency.

In addition, the method of controlling a wireless power transmitting device further includes generating information of a magnitude of received power by receiving a packet signal having information of a magnitude of received power of the receiving device from the receiving device and demodulating the packet signal, and calculating a magnitude of supplied power using a voltage and a current of the power source.

Here, the comparing S40 of the wireless power transmitting device further includes calculating the power transmission efficiency based on a magnitude of the supplied power and a magnitude of the received power, and the detecting S10 of the wireless power transmitting device further includes detecting a voltage and a current of the power source.

As set forth above, according to examples, a wireless power transmitting device may reflect or account for information regarding a distance between a wireless power transmitting device and a receiving device in detection of a foreign object to improve accuracy of foreign object detection, may reduce the frequency of malfunctions and unnecessary power consumption caused by misjudgment of foreign object detection, and may be stably operated and extend the service life by reducing influence of a foreign object during wireless power transmissions.

The distance calculator 140, comparator 150, controller 160, demodulator 235, analog-to-digital converter 236, distance calculator 240, power calculator 245, comparator 250, error checker 255, converter controller 261, converter control signal generator 262, inverter controller 263, inverter control signal generator 264, and driver 265 of FIGS. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, converters, demodulators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a receiving device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitting device, comprising:
a wireless power generator configured to generate a wireless power based on a supplied power of a power source;
a wireless power transmitter configured to transmit the wireless power to a receiving device in a wireless manner;

a detector configured to detect either one or both of a voltage and a current of the wireless power transmitter;

a distance calculator configured to calculate a distance from the wireless power transmitting device to the receiving device based on either one or both of the voltage and the current of the wireless power transmitter;

a comparator configured to:

compare a reference efficiency corresponding to the distance to a power transmission efficiency, and generate information of a transmission state based on a result of the comparison; and a controller configured to control the wireless power generator depending on an operation mode corresponding to the information of the transmission state.

2. The wireless power transmitting device of claim 1, wherein the controller is configured to:

set the operation mode to a first operation mode in response to the power transmission efficiency being equal to or higher than the reference efficiency;

set the operation mode to a second operation mode in response to the power transmission efficiency being lower than the reference efficiency; and control the wireless power generator such that a magnitude of the wireless power generated in response to the second operation mode being set is lower than a magnitude of the wireless power generated in response to the first operation mode being set.

3. The wireless power transmitting device of claim 1, further comprising:

a demodulator configured to:

receive a packet signal comprising information of a magnitude of a received power of the receiving device; and generate the information of the magnitude of the received power by demodulating the packet signal.

4. The wireless power transmitting device of claim 3, further comprising:

a power calculator configured to calculate a magnitude of the supplied power of the power source based on a voltage and a current of the power source, wherein the comparator is configured to calculate the power transmission efficiency based on the magnitude of the supplied power and the magnitude of the received power, and wherein the detector further is configured to detect a voltage and a current of the power source.

5. The wireless power transmitting device of claim 1, wherein:

the wireless power transmitter comprises a transmission coil configured to be electromagnetically coupled to the receiving device; and the voltage of the wireless power transmitter is a voltage of the transmission coil.

6. The wireless power transmitting device of claim 5, wherein the distance calculator is configured to calculate the distance such that the distance calculated if the voltage is a first voltage is longer than the distance calculated if the voltage is a second voltage lower than the first voltage.

7. The wireless power transmitting device of claim 5, wherein the comparator is configured to:

in response to the voltage being a first voltage, determine the distance to be a first distance; and in response to the voltage being a second voltage lower than the first voltage, determine the distance to be a second distance shorter than the first distance.

8. The wireless power transmitting device of claim 1, wherein the comparator is configured to determine the reference efficiency based on the distance.

9. The wireless power transmitting device of claim 8, wherein the comparator is configured to determine the reference efficiency such that the reference efficiency determined if the distance is a first distance is lower than the reference efficiency determined if the distance is a second distance shorter than the first distance.

10. The wireless power transmitting device of claim 8, wherein the comparator is configured to:

in response to the distance being a first distance, determine the reference efficiency to have a first magnitude; and in response to the distance being a second distance longer than the first distance, determine the reference efficiency to have a second magnitude less than the first magnitude.

11. The wireless power transmitting device of claim 1, wherein the controller is configured to:

determine a switching frequency of the wireless power generator based on the distance; and transmit a control signal of the switching frequency to the wireless power generator.

12. The wireless power transmitting device of claim 1, wherein the wireless power generator comprises:

a DC-DC converter comprising a first switch, and configured to convert a DC voltage of the power source through an on-off operation of the first switch and generate conversion power; and an inverter comprising a second switch and a third switch, and configured to generate the wireless power from the conversion power through an on-off operation of the second switch and the third switch, wherein the controller is further configured to generate a converter control signal to be transmitted to the first switch and an inverter control signal to be transmitted to the second switch and the third switch, and wherein either one or both of the converter control signal and the inverter control signal is changed according to a change in the operation mode.

13. A method of controlling a wireless power transmitting device, comprising:

detecting either one or both of a voltage or a current of a transmission coil in response to a wireless power transmitting device transmitting a wireless power to a receiving device through the transmission coil;

generating information of a distance between the wireless power transmitting device and the receiving device based on either one or both of the voltage or the current of the transmission coil;

generating information of a reference efficiency corresponding to the information of the distance;

comparing the reference efficiency to a power transmission efficiency of the wireless power transmitting device; and reducing a magnitude of the wireless power in response to the power transmission efficiency being lower than the reference efficiency.

14. The method of controlling a wireless power transmitting device of claim 13, further comprising: generating information of a magnitude of a received power by receiving, from the receiving device, a packet signal comprising the information of the magnitude of the received power of the receiving device, and demodulating the packet signal.

15. The method of controlling a wireless power transmitting device of claim 14, further comprising:

calculating a magnitude of a supplied power from a voltage and a current of a power source of the wireless power transmitting device, wherein the comparing comprises calculating the power transmission efficiency based on the magnitude of the supplied power and the magnitude of the received power, and wherein the detecting comprises detecting the voltage and the current of the power source.

16. A non-transitory computer-readable medium storing instructions that, when executed by a processor, cause the processor to perform the method of claim 13.

17. A wireless power transmitting device, comprising:

a wireless power generator configured to generate a wireless power based on a supplied power of a power source;

a wireless power transmitter configured to:

transmit the wireless power to a receiving device, and receive information of a magnitude of a received power of the receiving device;

a power calculator configured to calculate a magnitude of the supplied power based on either one or both of a voltage and a current of the power source;

a distance calculator configured to calculate a distance from the wireless power transmitting device to the receiving device based on either one or both of a voltage and a current of the wireless power transmitter;

a comparator configured to:

determine a reference efficiency based on the distance, calculate a power transmission efficiency based on the magnitude of the supplied power and the magnitude of the received power, and compare the reference efficiency to the power transmission efficiency; and a controller configured to control the wireless power generator to reduce the magnitude of the generated wireless power in response to the power transmission efficiency being lower than the reference efficiency.

\* \* \* \* \*